United States Patent
Parys

(10) Patent No.: US 7,693,485 B2
(45) Date of Patent: Apr. 6, 2010

(54) BLUETOOTH POLLING WITH FEWER POLL PACKETS

(75) Inventor: Jorgen Van Parys, Grimbergen (BE)

(73) Assignee: STMicroelectronics N.V., Amsterdam (NL)

( * ) Notice: Subject to any disclaimer, the term of this patent is extended or adjusted under 35 U.S.C. 154(b) by 827 days.

(21) Appl. No.: 10/996,124

(22) Filed: Nov. 23, 2004

(65) Prior Publication Data

US 2007/0177567 A1 Aug. 2, 2007

(30) Foreign Application Priority Data

Nov. 26, 2003 (EP) .................... 03078715

(51) Int. Cl.
H04B 7/00 (2006.01)
H04B 1/00 (2006.01)
H04B 1/04 (2006.01)
H04J 3/06 (2006.01)

(52) U.S. Cl. ............... 455/41.2; 455/41.3; 455/63.1; 455/114.2; 370/512

(58) Field of Classification Search ........ 455/41.2, 455/41.3, 558, 557, 556.1, 574, 63.1, 114.1; 370/406, 512
See application file for complete search history.

(56) References Cited

U.S. PATENT DOCUMENTS

| | | | | |
|---|---|---|---|---|
| 6,570,857 | B1 * | 5/2003 | Haartsen et al. | 370/312 |
| 6,614,350 | B1 * | 9/2003 | Lunsford et al. | 340/572.1 |
| 7,483,677 | B2 * | 1/2009 | Zechlin et al. | 455/73 |
| 2002/0028657 | A1 | 3/2002 | Davies | |
| 2002/0136268 | A1 * | 9/2002 | Gan et al. | 375/133 |
| 2004/0044724 | A1 * | 3/2004 | Bell et al. | 709/203 |
| 2006/0089119 | A1 * | 4/2006 | Lipasti et al. | 455/410 |

FOREIGN PATENT DOCUMENTS

| | | | |
|---|---|---|---|
| WO | WO9937106 | * 12/1998 | |
| WO | WO9937106 | * 7/1999 | 455/41.2 |
| WO | WO 03/061215 A1 | 7/2003 | |
| WO | WO03061212 | * 7/2003 | |

OTHER PUBLICATIONS

European Search Report from European Patent Application 03078715.4, filed Nov. 26, 2003.
European Search Report from European Patent Application 03078716.2, filed Nov. 26, 2003.
Office Action mailed Dec. 23, 2009 from European Application No. 03 078 715.4.

* cited by examiner

*Primary Examiner*—Nick Corsaro
*Assistant Examiner*—Shannon R Brooks
(74) *Attorney, Agent, or Firm*—Lisa K. Jorgenson; William R. McClellan; Wolf, Greenfield & Sacks, P.C.

(57) ABSTRACT

A Bluetooth master unit polls a slave unit to enable the slave to resynchronize to the master, by sending POLL packets with sufficient frequency to maintain a connection to the slave, and in the intervals between such packets, sending NULL packets with sufficient frequency to maintain synchronization of the slave. By replacing some POLL packets with NULL packets, since the slave does not have to respond to a NULL packet, it can save some power, and there is reduced interference on other piconets. The frequency of the remaining POLL packets is set according to a Link Supervision Timeout (to avoid having this timer expire and thus keep the Bluetooth Link to the slave alive) and according to the time since the master received the last packet from the slave.

19 Claims, 2 Drawing Sheets

No packet transmitted by the slave

BLUETOOTH POLLING WITH FEWER POLL PACKETS

BACKGROUND OF THE INVENTION

1. Field of the Invention

This invention relates to methods of scheduling of polling packets for telecommunications devices using a telecommunications protocol, especially a wireless protocol, such as POLL packets of Bluetooth devices, to apparatus and software for carrying out such methods, and in particular to scheduling fewer polling packets when a telecommunications device such as a Bluetooth device is master of a radio link.

2. Description of the Related Art

Bluetooth is a well known short-range radio link intended to replace the cable(s) connecting portable and/or fixed electronic devices. Full details are available from Bluetooth SIG which has its global headquarters in Overland Park, Kans., USA. Key features are robustness, low complexity, low power, and low cost. Bluetooth operates in the unlicensed ISM band at 2.4 GHz. A frequency hop transceiver is applied to combat interference and fading. A slotted channel is applied with a nominal slot length of 625 μs. On the channel, information is exchanged through packets. In Bluetooth version 1.1 each packet is transmitted on a different hop frequency. In Bluetooth version 1.2 it is proposed that transmission and receive packets may be sent on the same frequency. The Bluetooth protocol uses a combination of circuit and packet switching. Slots can be reserved for synchronous packets.

The Bluetooth system can provide a point-to-point connection (only two Bluetooth units involved), or a point-to-multipoint connection. In the point-to-multipoint connection, the channel is shared among several Bluetooth units. Two or more units sharing the same channel form a piconet. One Bluetooth unit acts as the master of the piconet, whereas the other unit(s) acts as slave(s). Up to seven slaves can be active in the piconet. In addition, many more slaves can remain locked to the master in a so-called parked state. These parked slaves cannot be active on the channel, but remain synchronized to the master. Both for active and parked slaves, the channel access is controlled by the master. Units can also be in a hold mode or a sniff mode.

In the active mode, the Bluetooth unit actively participates on the channel. The master schedules the transmission based on traffic demands to and from the different slaves. In addition, it supports regular transmissions to keep slaves synchronized to the channel. Active slaves listen in the master-to-slave slots for packets. If an active slave is not addressed, it may sleep until the next new master transmission. From the type indication in the packet, the number of slots the master has reserved for its transmission can be derived; during this time, the non-addressed slaves do not have to listen on the master-to-slave slots. A periodic master transmission is required to keep the slaves synchronized to the channel. Since the slaves only need the channel access code to synchronize with, any packet type can be used for this purpose.

NULL packets can be sent by a master and used by the slave to maintain synchronization. The POLL packet is very similar to the NULL packet. It does not have a payload either. In contrast to the NULL packet, it requires a confirmation from the recipient. Upon reception of a POLL packet the slave must respond with a packet. This return packet is an implicit acknowledgement of the POLL packet. The POLL packet can be used by the master in a piconet to poll the slaves, which must then respond even if they do not have information to send.

Synchronization is important for ad-hoc connections. In the Bluetooth system, each unit has a free-running native clock which has an accuracy of 20 ppm when the unit is active and 250 ppm when the unit is in a low-power mode. When a unit wants to page another unit, it can speed up the connection establishment when it knows the recipient's native clock. This clock information should be stored during a previous connection stage. A Bluetooth unit can thus have a list of unit addresses with corresponding native clocks it can use when paging one of those units. The clock information is stored as a time offset to its own native clock. When a piconet is in operation, it is the native clock in the master that determines the timing. The slaves add an offset to their native clocks in order to be hop synchronized to the master. The slave's native clock plus the offset with respect to the master provide the proper input to the hop selection scheme. Since the native clocks of the master and the slave are free-running, the offset in the slaves has to be adjusted continuously to compensate for drift. The reception of packets sent by the master is used to adjust the offset. The access code in front of the packet has the proper autocorrelation properties to enable a slave to derive the timing.

A master needs to send a poll packet occasionally, to maintain its awareness of other slaves within range, and to maintain synchronisation of such slaves. The number of poll packets sent should be kept to a minimum to avoid the power cost of causing these slaves to have to transmit. Transmitting usually costs more power than receiving and so contributes to draining the batteries of units which are presumably trying to save power by being in the sniff mode. As well as this efficiency goal, a polling master in Bluetooth should also be fair. In the Bluetooth best effort case, fairness implies that slaves get the same fraction of their fair share of communication time where the fair share is determined by rules.

For scheduling POLL packets during Sniff mode, several scheduling algorithms exist and are in use in commercially available devices. The more advanced algorithms stop scheduling POLL packets (and start scheduling NULL packets) in the sniff attempts when the slave has synchronized (i.e. when the slave did respond with a NULL packet). In other words when the slave has synchronized, it is sufficient to send NULL packets for the remaining master Tx slots of the sniff attempts. This algorithm is not suitable for implementations that are using a "prescheduling algorithm". In "prescheduling implementations", Tx/Rx packet pairs are allocated in advance. For a master (using a prescheduling algorithm) of a Bluetooth link in sniff mode, this means that the master does not know in advance (i.e. at the time the actual scheduling occurs) when the slave will be synchronized. One possible solution to this problem is to send POLL packets in every Tx slot of the Sniff attempts, but this costs transmit power at the slave side (since the slave is obliged to respond to POLL packets).

Several scheduling algorithms exist and are known. Usually, for scheduling POLL packets on an active Bluetooth link, a very simple algorithm is used, involving continuously and periodically sending a POLL packet. This obliges the slave device to transmit a packet (e.g. a NULL packet), at the cost of spending some energy in its transmit chain. Another (smaller) disadvantage is the interference on other piconets generated by the slave. The interval in which POLL packets are sent can not simply be increased: the slave needs sufficient synchronization points (i.e. packets received from the master) to stay synchronized and to have the chance to transmit data.

SUMMARY OF THE INVENTION

According to a first aspect, the invention provides:

a master wireless, e.g. radio frequency, unit arranged to communicate with a slave wireless, e.g. radio frequency, unit by sending packets, and having a controller arranged to address the slave to enable the slave to resynchronize to the master, by sending packets of a type which prompt a response from the slave sufficiently often, e.g. with sufficient frequency or at a first rate, to maintain a connection to the slave, and in the intervals between such packets, sending packets of a type which need no response sufficiently often, e.g. with sufficient frequency or at a second rate, to maintain synchronization of the slave. A frequency hop scheme can be used.

The addressing of the slave device includes addressing each slave device individually rather than broadcasting to all slave devices. A plurality of slave devices may be in communication with a master device. In this case, each slave device is addressed individually using packets which need no response, the packets therefore being associated with the relevant slave device address. The present invention is particularly useful when a connection between a slave device and a master device is lost if the synchronization between slave and master is not completed successfully.

By being able to set and thereby reduce the ratio of the number of packets needing a response to the number not needing a response, the critical factor of power consumption can be reduced. In a Bluetooth implementation, this means the master can reduce the number of POLL packets sent (periodically) to the slave by replacing some of them with NULL packets. Since the slave does not have to respond to a NULL packet, this approach allows the slave to save some power. Another (smaller) effect is reduced interference (on other piconets) caused by the slave.

As additional features, the communication can use the Bluetooth standard and/or the polling can take place while the master is in an active mode. Further such features include using Bluetooth POLL packets and NULL packets, and arranging the frequency of sending the POLL packets in accordance with:

the Link Supervision Timeout (which is under the master's control) and/or the time since the master received the last packet from the slave.

This approach can give the slave the same number of synchronization points and the same number of opportunities to transmit data, while preserving power (in case no data needs to be transmitted by the slave). In order to avoid the Link Supervision timer expiring (and thus to keep the Bluetooth Link alive), preferably a minimum number of POLL packets need to be sent.

To maintain synchronization, it is preferred if the frequency of the NULL packets is the same as the POLL packets they replace, that is the frequency of the NULL packets can be 1/Tpoll, where Tpoll is the time interval between POLL packets before replacing with NULL packets. In many implementations, the value of Tpoll depends on the quality of service needed by the application running on top of an active link at a higher level. A default Tpoll may be, for instance, 40 time slots. It is preferred if the quality of service can be negotiated at the LMP level between master and slave. For instance, the master can inform the slave of the Tpoll being used, and/or the slave can request a certain Tpoll value.

In one aspect of the present invention, it is preferred if the negotiated quality of service is not violated by changing the effective Tpoll value, whereby the reference for this Tpoll value is before replacement with the NULL packets.

Another aspect of the invention provides consumer equipment having the master wireless, e.g. radio, unit. Another aspect provides software for implementing the controller of the master wireless, e.g. radio, unit. Another aspect provides a method of polling from a master wireless, e.g. radio, unit. Another aspect provides a sequence of radio signals used to poll from a master wireless, e.g. radio unit.

Any of the additional features may be combined with each other or with any of the aspects of the invention. Other advantages of the invention may be apparent to those skilled in the art, particularly in view of other prior art not known to the inventors. How the present invention may be put into effect will now be described with reference to the appended schematic drawings. Obviously, numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

The features of the invention will be better understood by reference to the accompanying drawings, which illustrate preferred embodiments of the invention. In the drawings.

DESCRIPTION OF THE PREFERRED EMBODIMENTS

Figure 1:
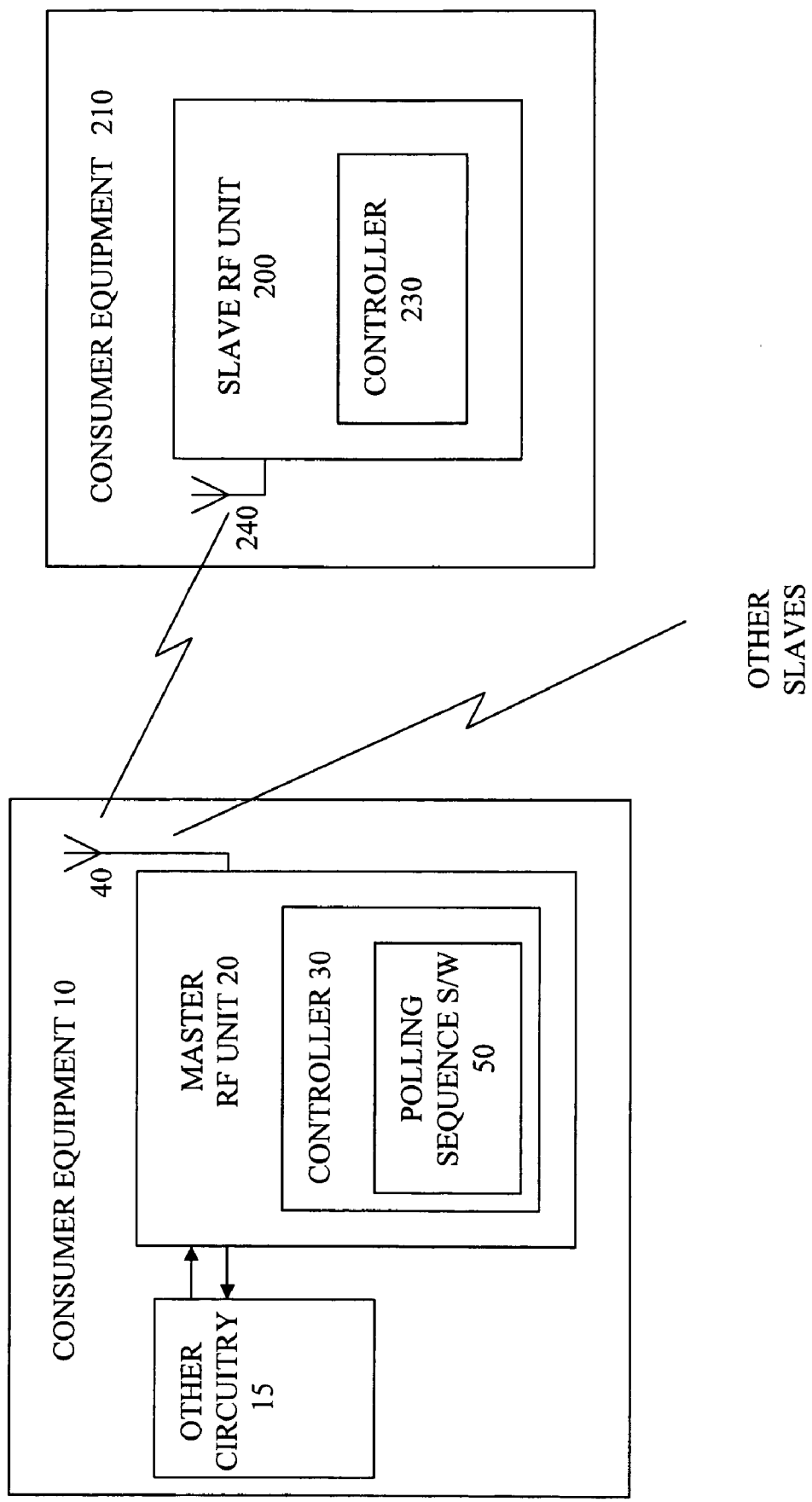
FIG. 1 is a schematic view of a Bluetooth master unit in consumer equipment as can be used in embodiments of the present invention.

The present invention will now be described with reference to certain embodiments and with reference to the above mentioned drawings. Such description is by way of example only and the invention is not limited thereto. In particular the present invention will be described with reference to radio communications network but the present invention is not limited thereto. The term "wireless" should be interpreted widely to cover any communications system which does not use fix wireline communications for some of its transmissions. Alternative wireless communications systems include optical systems such as those operating with diffuse infra-red. It should also be noted that the term "wireless" also includes so-called cordless systems. General aspects of cordless communications systems are described for instance in the book by W. Tuttlebee, "Cordless Telecommunications Worldwide", Springer, 1997. Cordless systems are generally local, uncoordinated radio communications networks having a limited range. It will be noted, however, that all the embodiments of the present invention can be used with the Bluetooth™ protocol. A network operated in accordance with the Bluetooth may be described as an uncoordinated cellular system. Embodiments of the present invention may be limited to one or more of the following features of such a system:

slow frequency hopping as a spread spectrum technique; master and slave units; a master unit can set the hopping sequence; each device has its own clock and its own address; the hopping sequence of a master unit can be determined from its address; a set of slave units communicating with one master all have the same hopping frequency (i.e. the one of the master) and form a piconet; piconets can be linked through common slave units to form a scatternet; Time Division Multiplex Transmissions (TDMA) are used between slave and master units; Time Division Duplex (TDD) transmissions are used between slave and master units; transmissions between slave and master units may be either synchronous or asynchronous; master units can determine when slave units can transmit; slave units may only reply when addressed by a master unit; the clocks in each telecommunications device are free-running; the systems may be uncoordinated networks, especially those operating in the 2.4 GHz license-free ISM band; a software stack may be used to enable applications to find other Bluetooth™ devices in the area; other devices are found by a discovery/inquiry procedure; and hard or soft handovers between access points may be used.

With regard to frequency hopping, "slow frequency hopping" refers to the hopping frequency being slower than the modulation rate, whereas "fast frequency hopping" referring to a hopping rate faster than the modulation rate. The present invention is not necessarily limited to either slow or fast hopping, but slow frequency hopping is preferred.

In addition, in the following reference will be made to "mobile terminals" however the present invention is not limited to all user terminals being mobile. Fixed terminals, e.g. a desk top computer, may be used equally well with the present invention. Reference will also be made to "packets" but the present invention is not limited to packet switched systems. The term "packet based" refers to any system which uses packets of information for transmission purposes whether the system is packet or circuit switched or any other type.

A first embodiment of the invention is shown in FIG. 1. A master RF unit 20 and a slave RF unit 200 are shown. As set out in the Bluetooth standard, the master is represented by the Bluetooth unit that initiates the connection (to one or more slave units). Note that the names 'master' and 'slave' only refer to the protocol on the channel: the Bluetooth units themselves are identical; that is, any unit can become a master of a piconet. Once a connection has been established, master-slave roles can be exchanged. The master radio frequency unit 20 has an antenna 40 for transmitting the Bluetooth radio signals over the air. In principle the RF signals can be transmitted over other media. The Bluetooth master unit is incorporated into consumer equipment 10. This can be mobile equipment such as a mobile phone, a smart phone, a cordless phone, a laptop or notebook computer or personal digital assistant for example, or other household equipment such as audio or video equipment, headsets, remote monitoring or sensing equipment and so on. Or it can be a PCMCIA card or a PCI card for a personal computer, a USB adapter or card, a modification for a PDA such as a cradle or plug-in to provide the Bluetooth capablity, a Bluetooth access point, e.g. for a local area network, or an adapter for other commercial or household equipment with a radio link, e.g. in automotive vehicles and applications. It may also be a module which provides radio services and which may be included with other semiconductor devices, e.g. on a PCB. Data for transmission over the Bluetooth link is passed to the master unit from other circuitry 15.

The master unit has a controller 30 for executing the polling sequence and other sequences. The controller is typically in the form of a microprocessor or other conventional hardware such as application specific circuitry or sequencers. The polling sequence may be in the form of software 50 which can be embedded in ROM or other memory, or be in removable or rewritable form. The software for implementing the polling sequence and other control sequences can be written in conventional computer readable code or languages, for execution by the controller. The slave RF unit 200 has a similar controller 230. Other parts of the units are not shown for the sake of clarity, and the reader is referred to the well known Bluetooth specification for more details.

Figure 2:
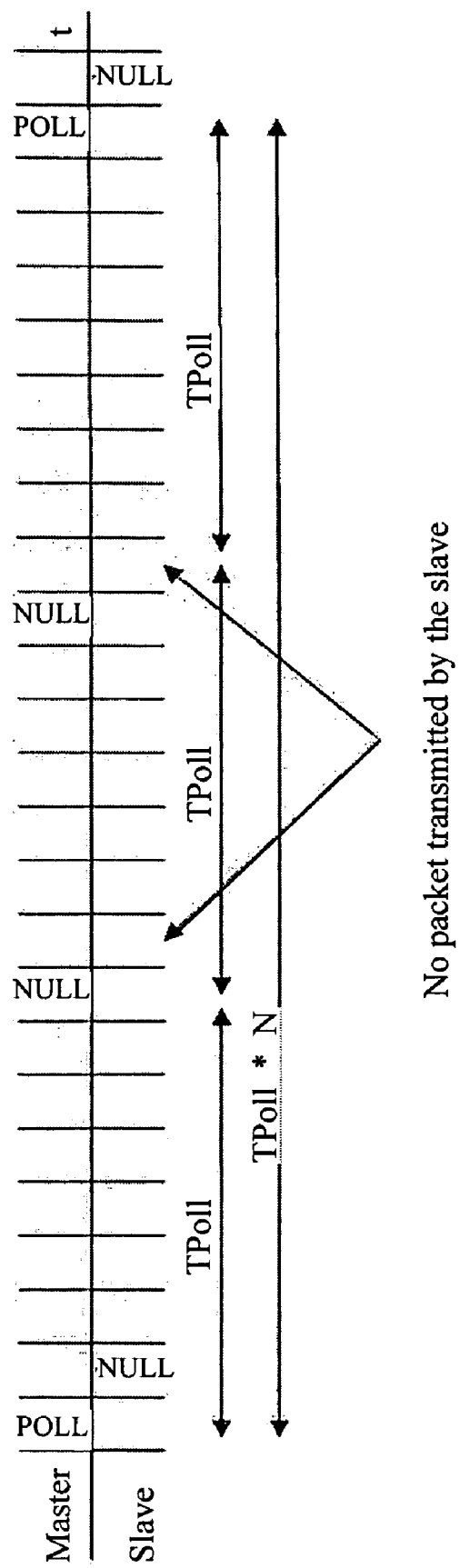
FIG. 2 is a time sequence of packets sent during the polling from a master to a slave according to an embodiment of the invention.

FIG. 2 shows an example of a polling sequence for the link of FIG. 1. In this figure, the upper row shows a sequence of master time slots and the lower row shows slave slots. The master may need to schedule slots to serve many slaves, and many scheduling schemes have been proposed to provide fair and efficient sharing. The figure shows a polling sequence in which a POLL packet is sent by the master, prompting an immediate NULL packet from the slave. This resets the Link Supervision Timeout for that slave. After a period, a NULL packet is sent by the master, and this is repeated before another POLL packet is sent, again prompting an immediate NULL packet response from the slave. Thus in effect, a number of POLL packets have been replaced by NULL packets. The interval between packets sent by the master is shown as $T_{poll}$. Hence the frequency to maintain synchronization is $1/T_{poll}$. The interval between POLL packets is shown as, hence the frequency of such packets is $1/(T_{poll}*N)$. These configurable parameters will now be explained.

$T_{poll}$=interval on which POLL or NULL packets are sent by the master N=number of $T_{poll}$ intervals, expressing the ratio (1/N) between the number of POLL packets vs the number of NULL packets. A maximum value for N could be derived from the Link Supervision Timeout: e.g.

N<=LinkSupervisionTimeout/$T_{poll}$. In order to have some margin and to allow for some packet loss, the formula becomes:

N<=LinkSupervisionTimeout/($T_{poll}*M$), Where M is a non-zero number and can be an integer but this is not essential.

In order to determine whether a POLL packet can be replaced by NULL packets, another measured variable is useful:

LastSlaveRxTime=time since the master received the last packet from the slave.

Determining whether a POLL packet can be replaced by a NULL packet can be expressed in pseudo-code as follows:

When a POLL or NULL packet needs to be sent:
IF (LastSlaveRxTime=>$T_{poll}*N$) THEN
Send POLL
ELSE
Send NULL As shown in FIG. 2, where a NULL packet can be sent by the master, no response packet need by transmitted by the slave, which results in the saving of power used in transmission, which is usually greater than that used for reception or internal processing. This means battery life can be extended, which is critical for many applications. The NULL packets can be replaced by any type of packets since all types contain the channel access code from which timing information can be derived to enable synchronization, as is well known.

Clearly the advantages are applicable beyond Bluetooth to other similar RF protocols. They can apply wherever there is polling to maintain synchronization or to maintain awareness of other devices within range. This sort of synchronization is needed for any type of frequency hopping system, if a connection is to be maintained with minimum power consumption. The synchronization state of slaves can be recorded in ways other than a link supervision timer.

The present invention also includes software which when run on an executing computing or processing device executes one of the methods of the invention. In particular the software code is suitable for running on a controller of a master wireless unit arranged to communicate with a slave wireless unit by sending packets, whereby the software code is arranged so that when it is executed the controller addresses the slave to enable the slave to resynchronize to the master, by sending packets of a type which prompt a response from the slave at a first rate, i.e. sufficiently often to maintain a connection to the slave, and in the intervals between such packets, sending packets of a type which need no response at a second rate sufficiently often to maintain synchronization of the slave. The software when executed can set a ratio of packets of a type which prompt a response from the slave to packets which need no such response. The ratio is preferably set or varied while keeping the total number of packets of a type which prompt a response and packets which need no response the same, i.e. to maintain a quality of service requirement. Additional software code may provide a frequency hop scheme when executed on a master unit. For example, the software code may execute the Bluetooth standard in a master unit for communicating with the slave unit. The software code may be arranged to execute so that the polling is carried out when the slave unit is in an active mode. For example, the packets of the type needing no response can be Bluetooth NULL packets. Also, for example, the packets of the type which prompt a response can be Bluetooth POLL packets. The software code when executed on a master unit may set the frequency of sending the packets of the type which prompt a response in accordance with a Link Supervision Timeout. The software code may also set the frequency of sending the packets of the type which prompt a response in accordance with a time since the master received the last packet from the slave. The software is preferably written in a high level language and then compiled on a compiler which is adapted for a microprocessor used within the controller of the master unit. Alternatively, the software may be written for implementation on a programmable digital logic device, such as a Programmable Gate Array, especially a Field Programmable Gate Array (FPGA).

As described above, a Bluetooth master unit polls a slave unit to enable the slave to resynchronize to the master, by sending POLL packets at a first rate, e.g. with sufficient frequency to maintain a connection to the slave, and in the intervals between such packets, sending NULL packets at a second rate with sufficient frequency to maintain synchronization of the slave. By replacing some POLL packets with NULL packets, since the slave does not have to respond to a NULL packet, it can save some power, and there is reduced interference on other piconets. The frequency of the remaining POLL packets can be set according to a Link Supervision Timeout (to avoid this timer expiring and thus keep the Bluetooth Link to the slave alive) and/or according to the time since the master received the last packet from the slave. By replacing POLL packets by NULL packets the overall quality of service rules as negotiated for example between master and slave are not violated. Other variations can be envisaged by those skilled in the art which are intended to be within the scope of the claims.

What is claimed is:

1. A master wireless unit arranged to communicate with a slave wireless unit by sending packets, and having a controller configured to arrange to address the slave to enable the slave to resynchronize to the master by transmitting packets in a polling mode in which packets are addressed to the slave individually rather than broadcast and in which the packets are transmitted at intervals sufficient to maintain synchronization to the slave, the packets transmitted in the polling mode including first packets of a type which prompt a response from the slave, the first packets transmitted at a rate to maintain a connection to the slave, and in each interval between successive first packets, the packets transmitted in the polling mode further including several second packets of a type which need no response by the slave, to maintain synchronization of the slave, wherein the first packets and the second packets are transmitted in the polling mode in a repeating sequence.

2. The master unit according to claim 1, wherein the controller is adapted to set a ratio of the number of first packets sent within a time period of a type which prompt a response from the slave to the number of second packets sent within the same time period which need no response.

3. The master unit according to claim 2, wherein the controller is adapted to set a different ratio within the time period while keeping the total number of first packets of a type which prompt a response and second packets which need no response the same.

4. The master unit according to claim 1, wherein the master unit comprises means for providing a frequency hop scheme.

5. The master unit of claim 1, arranged to use a Bluetooth standard for communicating with the slave unit.

6. The master unit of claim 1, arranged to send first packets of the type which prompt a response from the slave when the slave unit is in an active mode.

7. The master unit of claim 1, wherein the second packets of the type which need no response are Bluetooth NULL packets.

8. The master unit of claim 1, wherein the first packets of the type which prompt a response are Bluetooth POLL packets.

9. The master unit of claim 1, wherein the rate of sending the first packets of the type which prompt a response, is set in accordance with a Link Supervision Timeout.

10. The master unit of claim 1, wherein the rate of sending the first packets of the type which prompt a response, is set in accordance with a time since the master received the last packet from the slave.

11. Consumer equipment having the master unit of claim 1.

12. A computer readable medium encoded with a computer program which, when executed by a controller of a master radio, carries out the steps of:

addressing a slave, by the control of the master radio, to enable the slave to resynchronize to the master by transmitting packets in a polling mode in which packets are addressed to the slave individually rather than broadcast and in which the packets are transmitted at intervals sufficient to maintain synchronization to the slave, the packets transmitted in the polling mode including first packets of a type which prompt a response from the slave, the first packets transmitted at a rate to maintain a connection to the slave, and in each interval between successive first packets, the packets transmitted in the polling mode further including several second packets of a type which need no response by the slave, to maintain synchronization of the slave, wherein the first packets and the second packets are transmitted in the polling mode in a repeating sequence.

13. A method of using a master wireless unit to communicate with a slave wireless unit by sending packets and having the steps of addressing the slave to enable the slave to resynchronize to the master, by transmitting packets in a polling mode in which packets are addressed to the slave individually rather than broadcast and in which the packets are transmitted at intervals sufficient to maintain synchronization to the slave, the packets transmitted in the polling mode including first packets of a type which prompt a response from the slave the first packets transmitted at a rate, to maintain a connection to the slave, and in each interval between successive first packets, the packets transmitted in the polling mode further including several second packets of a type which need no response by the slave, to maintain synchronization of the slave, wherein the first packets and the second packets are transmitted in the polling mode in a repeating sequence.

14. The method of claim 13, further comprising setting a ratio of first packets of a type which prompt a response from the slave to second packets which need no response.

15. The method according to claim 14, wherein setting a ratio includes setting a different ratio within a time period while keeping the total number of first packets of a type which prompt a response and second packets which need no response the same.

16. The method of claim 13, wherein the second packets of the type which need no response are Bluetooth NULL packets.

17. The method of claim 13, wherein the first packets of the type which prompt a response are Bluetooth POLL packets.

18. The method of claim 13, wherein the rate of sending the first packets of the type which prompt a response is set in accordance with a Link Supervision Timeout.

19. The method of claim 13, wherein the rate of sending the first packets of the type which prompt a response is set in accordance with a time since the master received the last packet from the slave.

* * * * *